(12) United States Patent
Gao et al.

(10) Patent No.: US 10,425,026 B2
(45) Date of Patent: Sep. 24, 2019

(54) INDEPENDENT SPEED VARIABLE FREQUENCY ALTERNATING CURRENT GENERATOR

(71) Applicant: The Boeing Company, Chicago, IL (US)

(72) Inventors: Lijun Gao, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/819,919

(22) Filed: Nov. 21, 2017

(65) Prior Publication Data

US 2019/0158002 A1    May 23, 2019

(51) Int. Cl.
*H02P 9/00*    (2006.01)
*H02P 9/30*    (2006.01)
*H02K 1/27*    (2006.01)
*H02K 19/26*   (2006.01)

(52) U.S. Cl.
CPC ............. *H02P 9/007* (2013.01); *H02K 1/272* (2013.01); *H02K 19/26* (2013.01); *H02P 9/302* (2013.01)

(58) Field of Classification Search
CPC ......... H02P 9/007; H02P 9/302; H02K 1/272; H02K 19/26
USPC ............................................. 322/44, 28, 89
See application file for complete search history.

(56) References Cited

U.S. PATENT DOCUMENTS

| | | | | |
|---|---|---|---|---|
| 2,896,143 A | * | 7/1959 | Bekey | H02K 16/025 310/115 |
| 4,625,160 A | * | 11/1986 | Hucker | H02K 3/16 310/115 |
| 4,772,802 A | * | 9/1988 | Glennon | F02N 11/04 290/31 |
| 4,868,406 A | * | 9/1989 | Glennon | F02N 11/04 290/4 R |
| 5,036,267 A | * | 7/1991 | Markunas | F02N 11/04 322/10 |
| 5,068,590 A | * | 11/1991 | Glennon | F02N 11/04 290/38 R |
| 5,581,168 A | * | 12/1996 | Rozman | F02N 11/04 290/22 |
| 6,462,429 B1 | * | 10/2002 | Dhyanchand | F02N 11/04 290/31 |

(Continued)

OTHER PUBLICATIONS

European Patent Office; Extended European Search Report; European Patent Application No. 18202257.4 dated Apr. 23, 2019.

*Primary Examiner* — Julio C. Gonzalez
(74) *Attorney, Agent, or Firm* — Parsons Behle & Latimer

(57) ABSTRACT

An independent speed variable frequency alternating current (AC) generator apparatus may include a rotor and a stator, the rotor configured to rotate relative to the stator. The apparatus may further include a magnetic field source attached to the rotor and configured to generate a first rotating magnetic field upon rotation of the rotor, where a rotational frequency of the first rotating magnetic field is dependent on a rotational frequency of the rotor. The apparatus may also include a main rotor winding attached to the rotor and configured to generate a second rotating magnetic field upon the rotation of the rotor, where a rotational frequency of the second rotating magnetic field is independent of the rotational frequency of the rotor.

20 Claims, 5 Drawing Sheets

(56) References Cited

U.S. PATENT DOCUMENTS

| | | | | |
|---|---|---|---|---|
| 8,593,095 B2* | 11/2013 | Markunas | .................. | H02P 6/20 |
| | | | | 318/400.33 |
| 2004/0113592 A1* | 6/2004 | Adams | ................... | H02H 7/065 |
| | | | | 322/27 |
| 2010/0308582 A1* | 12/2010 | Rozman | ................ | H02M 3/156 |
| | | | | 290/31 |
| 2012/0211981 A1* | 8/2012 | De Wergifosse | ....... | F02C 7/275 |
| | | | | 290/31 |
| 2013/0172148 A1* | 7/2013 | Wiencek | .............. | F02D 31/007 |
| | | | | 477/77 |
| 2014/0265744 A1 | 9/2014 | Rozman | | |
| 2015/0244303 A1 | 8/2015 | Gao et al. | | |

* cited by examiner

INDEPENDENT SPEED VARIABLE FREQUENCY ALTERNATING CURRENT GENERATOR

FIELD OF THE DISCLOSURE

This disclosure is generally related to the field of alternating current (AC) generators and, in particular, independent speed variable frequency AC generators.

BACKGROUND

Aircraft, and other vehicles, typically include systems that rely on AC power sources. In a typical aircraft, the AC power may be generated by rotation of a primary mover attached to a generator (e.g., a permanent magnet generator). Three-phase power windings may be used within the generator to convert a magnetic field rotated by the primary mover into the AC power signal. As such, the frequency, amplitude, and phase of power initially generated by a single typical generator may be dependent on a rotational frequency of the primary mover.

In order to generate an AC power source with an independent or variable frequency, a typical aircraft electric propulsion train may include two stages of power conversion: first, from a generated AC power signal to a direct current (DC) power signal; second, from the DC power signal to an independent frequency AC power signal, which may be used to drive a motor for propulsion or for other AC powered devices within the vehicle. Having two converter stages may decrease the efficiency of AC power generation and may add significant weight to aircraft systems. Additional disadvantages may exist.

SUMMARY

Disclosed are systems and methods that may overcome at least one of the above-identified disadvantages. For example, an independent speed variable frequency AC generator apparatus may include a rotor and a stator, where a rotational frequency of a rotating magnetic field associated with a main winding of the rotor is independent of a rotational frequency of the rotor.

In an embodiment, an independent speed variable frequency AC generator apparatus includes a rotor and a stator, the rotor configured to rotate relative to the stator. The apparatus further includes a magnetic field source attached to the rotor and configured to generate a first rotating magnetic field upon rotation of the rotor, where a rotational frequency of the first rotating magnetic field is dependent on a rotational frequency of the rotor. The apparatus also includes a main rotor winding attached to the rotor and configured to generate a second rotating magnetic field upon the rotation of the rotor, where a rotational frequency of the second rotating magnetic field is independent of the rotational frequency of the rotor.

In some embodiments, the magnetic field source includes a permanent magnet. In some embodiments, the apparatus includes a pilot winding attached to the stator and configured to convert the first rotating magnetic field into an AC power signal.

In some embodiments, the apparatus includes a generator control unit configured to modulate the AC power signal to generate a high-frequency AC power signal for transmission to the rotor, where a frequency of the high-frequency AC power signal is greater than the rotational frequency of the rotor. In some embodiments, the apparatus includes a high frequency transformer configured to transmit a high-frequency AC power signal from the stator to the rotor. In some embodiments, the high frequency transformer includes a first power transformer winding attached to the stator and a second power transformer winding attached to the rotor, where the first power transformer winding is configured to transfer the high-frequency AC power signal to the second power transformer winding. In some embodiments, the high frequency transformer omits contact power transmission mechanisms between the stator and the rotor.

In some embodiments, the apparatus includes a rectifier attached to the rotor and configured to convert a high-frequency AC power signal into a DC power signal. In some embodiments, the apparatus includes an inverter attached to the rotor and configured to convert a DC power signal into a main field AC power signal, where the main rotor field winding is driven with the main field AC power signal. In some embodiments, the apparatus includes a generator control unit coupled to the inverter and configured to control the main field AC power signal, thereby controlling a rotational speed, a direction, an amplitude, or any combination thereof of the second rotating magnetic field relative to the rotor. In some embodiments, the generator control unit includes control circuitry attached to the stator and control circuitry attached to the rotor, where the control circuitry attached to the rotor includes at least one proportional-integral-derivative (PID) controller. In some embodiments, the at least one PID controller is coupled to the inverter to control a frequency of the second rotating magnetic field, and the control circuitry attached to the rotor includes an additional PID controller coupled to the inverter to control a magnitude of the second rotating magnetic field. In some embodiments, the control circuitry attached to the stator is communicatively coupled to the control circuitry attached to the rotor via a control signal coupler that includes at least one first communication disc attached to the stator and at least one second communication disc attached to the rotor. In some embodiments, the first communication disc includes a light signal source and the second communication disc includes a phototransistor. In some embodiments, the apparatus includes a main stator winding configured to convert the second rotating magnetic field into an AC power signal.

In an embodiment, a method for independent speed variable frequency AC generation includes generating, at a magnetic field source attached to a rotor, a first rotating magnetic field upon rotation of the rotor, where a rotational frequency of the first rotating magnetic field is dependent on a rotational frequency of the rotor. The method further includes generating, at a main rotor winding attached to the rotor, a second rotating magnetic field upon the rotation of the rotor, where a rotational frequency of the second rotating magnetic field is independent of the rotational frequency of the rotor. The method also includes converting the second rotating magnetic field into an AC power signal at a main stator winding attached to a stator.

In some embodiments, the method includes converting the first rotating magnetic field into the AC power signal, modulating the AC power signal to generate a high-frequency AC power signal, transmitting the high-frequency AC power signal from the stator to the rotor, converting the high-frequency AC power signal into a DC power signal, and converting the DC power signal into a main field AC power signal, where the main rotor winding is driven with the main field AC power signal. In some embodiments, the method includes receiving a reference frequency signal from a generator control unit, generating a first intermediate frequency signal that is a difference of the reference frequency signal and a rotor frequency signal associated with the rotational frequency of the rotor, generating a second intermediate frequency signal that is a difference of the first intermediate frequency signal and a main field frequency signal associated with a rotational frequency of the second rotating magnetic field relative to the rotor, and converting the second intermediate frequency signal into an inverter control signal to direct an inverter to alter a main field AC power signal to speed up or slow down rotation of the second rotating magnetic field relative to the rotor.

In some embodiments, the first intermediate frequency signal is passed from the stator to the rotor via a control signal coupler that includes at least one first communication disc attached to the stator and at least one second communication disc attached to the rotor. In some embodiments, the generating the second rotating magnetic field further includes determining a sign of the first intermediate frequency signal, and generating a second inverter control signal to direct the inverter to rotate the second rotating magnetic field in a direction corresponding to the sign of the intermediate signal relative to the rotor. In some embodiments, the method includes receiving a reference voltage signal from the generator control unit, generating an intermediate voltage signal that is a difference between the reference voltage signal and a voltage signal associated with the AC power signal, and converting the intermediate voltage signal into an inverter control signal to direct the inverter to alter a main field AC power signal to increase or decrease a magnitude of the second rotating magnetic field.

In an embodiment, an AC generator rotor device includes a magnetic field source configured to generate a first rotating magnetic field upon rotation of a rotor, where a rotational frequency of the first rotating magnetic field is dependent on a rotational frequency of the rotor. The device further includes a main rotor winding configured to generate a second rotating magnetic field upon the rotation of the rotor, where a rotational frequency of the second rotating magnetic field is independent of the rotational frequency of the rotor.

In some embodiments, the device further includes a power transformer winding configured to receive a high-frequency AC power signal, a rectifier configured to convert the high-frequency AC power signal into a DC power signal, and an inverter configured to convert the DC power signal into a main field AC power signal, where the main rotor winding is driven with the main field AC power signal.

Figure 1:
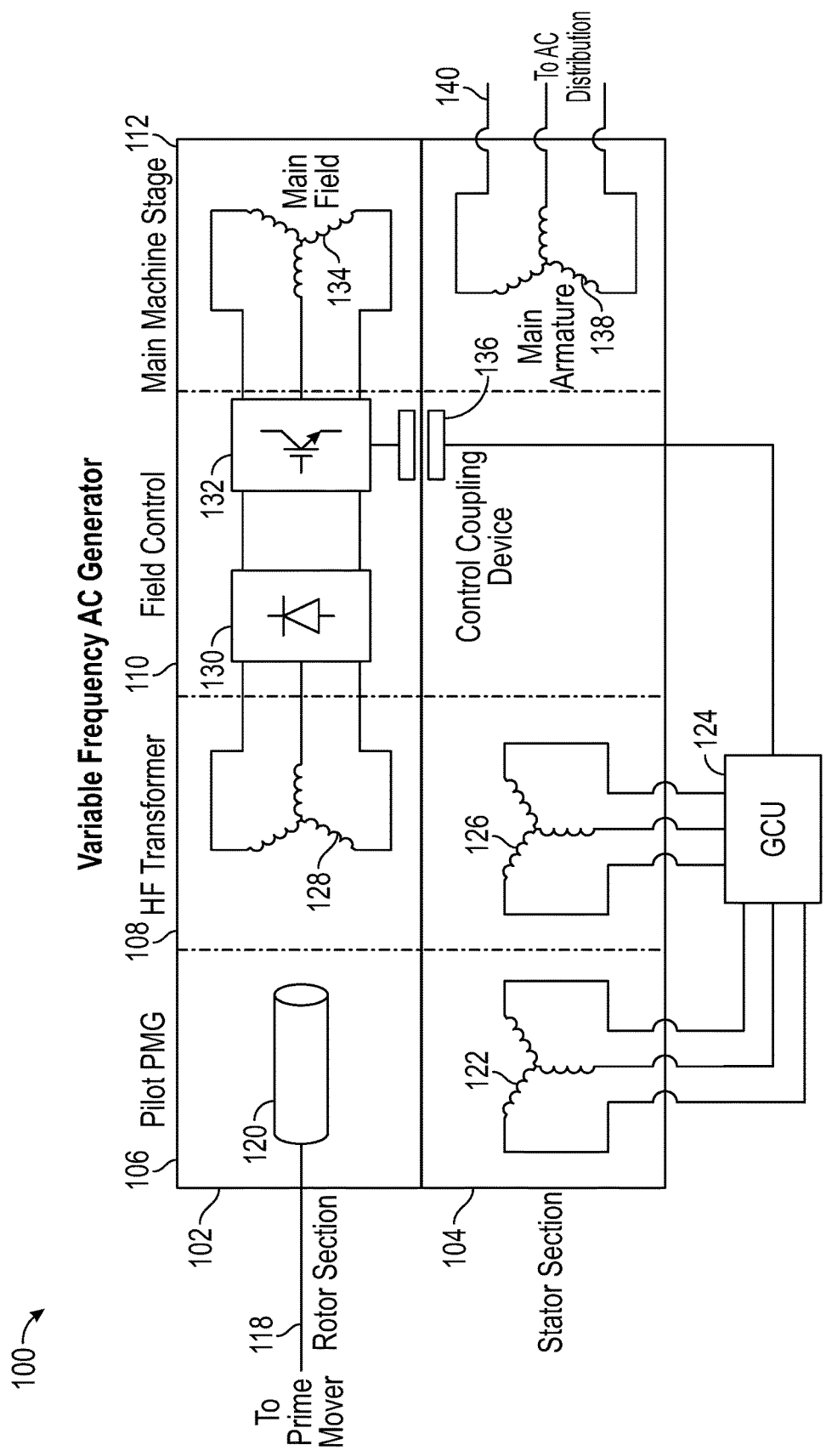
FIG. 1 is a schematic diagram depicting an embodiment of an independent speed variable frequency AC generator apparatus.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of an independent speed variable frequency AC generator apparatus 100 is depicted. The apparatus 100 may include a rotor 102 and a stator 104. FIG. 1 depicts the features of the rotor 102 and the stator 104 in different stages of AC generation. For example, components of the rotor 102 and the stator 104 may correspond to a pilot permanent magnet generator (PMG) stage 106, a high frequency (HF) transformer stage 108, a field control stage 110, and a main machine stage 112.

The rotor 102 may be rotated by a prime mover 118. For example, the prime mover may be a turbine engine or another mechanism for applying rotation. The rotor 102 may include a magnetic field source 120. In some embodiments, the magnetic field source 120 may be a permanent magnet. The apparatus 100 may further include a pilot winding 122 positioned on the stator 104.

During the pilot PMG stage 106, the prime mover 118 may rotate the rotor 102 relative to the stator 104. As the rotor 102 rotates, the magnetic field source 120 and its associated magnetic field, being fixed to the rotor 102, may rotate as well. The pilot winding 122 may be configured such that rotation of the magnetic field source 120 generates a three-phase AC power signal. The three-phase AC power signal may have a frequency that corresponds to and depends on the rotational frequency of the rotor 102.

The apparatus 100 may further include a generator control unit 124. The generator control unit 124 may perform multiple control functions within the apparatus 100. In order to perform the functions, the generator control unit 124 may include a power modulator circuit (not shown). The generator control unit 124 may also include a processor (not shown) configured to generate control signals. For example, the generator control unit 124 may include a central processing unit (CPU), a graphical processing unit (GPU), a digital signal processor (DSP), a peripheral interface controller (PIC), another type of microprocessor, and/or combinations thereof. It may be implemented as an integrated circuit, a field programmable gate array (FPGA), an application specific integrated circuit (ASIC), a combination of logic gate circuitry, other types of digital or analog electrical design components, or combinations thereof.

The apparatus 100 may include a first HF transformer winding 126 positioned on the stator 104 and a second HF transformer winding 128 positioned on the rotor 102. Together, the HF transformer windings 126, 128 may make up a HF transformer to transmit power from the stator 104 to the rotor 102. During the HF transformer stage 108, the generator control unit 124 may modulate the three-phase AC power signal received from the pilot winding 122 to generate an HF three-phase AC power signal. As used herein high frequency means that a frequency of the signal is greater than the rotational frequency of the rotor 102. As the frequency of the HF three-phase power signal increases, the effects of the rotation of the rotor 102 become less significant. This enables the HF three-phase power signal to be transmitted from the first HF transformer winding 126 to the second HF transformer winding 128 without significant interference or power losses caused by the rotation of the rotor 102. Because power is transmitted through the HF transformer windings 126, 128, the HF transformer stage 108 may omit contact power transmission mechanisms between the stator 104 and the rotor 102. For example, while typical power transmission mechanisms may include a slip-ring, or similar contact power transmission mechanism, the apparatus 100 omits these contact mechanisms. By eliminating contact between the stator 104 and the rotor 102, performance issues, such as arcing, wearing, and contact resistance may be avoided. This may result in greater reliability, lower maintenance costs, less downtime, and reduced power loss. Other advantages may exist.

The apparatus 100 may also include a rectifier 130 and an inverter 132. The generator control unit 124 may communicate with the inverter 132 via a control signal coupler 136. During the field control stage 110, the HF three-phase power signal may be transmitted from the second HF transformer winding 128 to the rectifier 130. The rectifier 130 may convert the HF three-phase AC power signal into a DC power signal. The DC power signal may then be transmitted to the inverter 132. The inverter 132 may be configured to receive control signals from the generator control unit 124 via the control signal coupler 136. Based on switching parameters set by the generator control unit 124 via the control signals, the inverter 132 may convert the DC power signal into a three-phase AC power signal. By controlling switching within the inverter 132, the generator control unit 124 may control a frequency, a phase, an amplitude, and/or other attributes of the three-phase AC power signal.

The apparatus 100 may include a main rotor winding 134 and a main stator winding 138. During the main machine stage 112, the three-phase AC power signal from the inverter 132 may drive the main rotor field winding 134 to produce a magnetic field that rotates relative to the rotor 102. By controlling the three-phase AC power signal, the generator control unit 124 may control a direction, rotational frequency, amplitude, and/or phase of the magnetic field relative to the rotor 102. With the additional rotation of the rotor 102, a rotating magnetic field may be generated with a rotational frequency that is independent of the rotational frequency of the rotor 102. As such, the frequency of the three-phase AC power signal generated at the main stator winding 138 may also be independent of the rotational frequency of the rotor 102. While the main rotor field winding 134 is described as a three-phase winding, persons of ordinary skill in the art, having the benefit of this disclosure, will understand that alternative winding setups, including more than three phases, may be used to generate the magnetic field rotating relative to the rotor 102.

The apparatus 100 may include a power distribution line 140 to provide power to systems and/or devices (not shown). In some embodiments, the power distribution line 140 may provide power to a vehicle, such as, but not limited to, an aircraft or spacecraft, and may be used to drive a propulsion motor.

A benefit of the apparatus 100 is that by creating a magnetic field at the main rotor field winding 134 that rotates relative to the rotor 102, a three-phase AC power signal may be generated at the main stator winding 138 having a frequency, a phase, and a magnitude that are independent from a rotational frequency or phase of the rotor 102 and independent of the strength of a permanent magnet attached to the rotor 102. Other advantages may exist.

Figure 2:
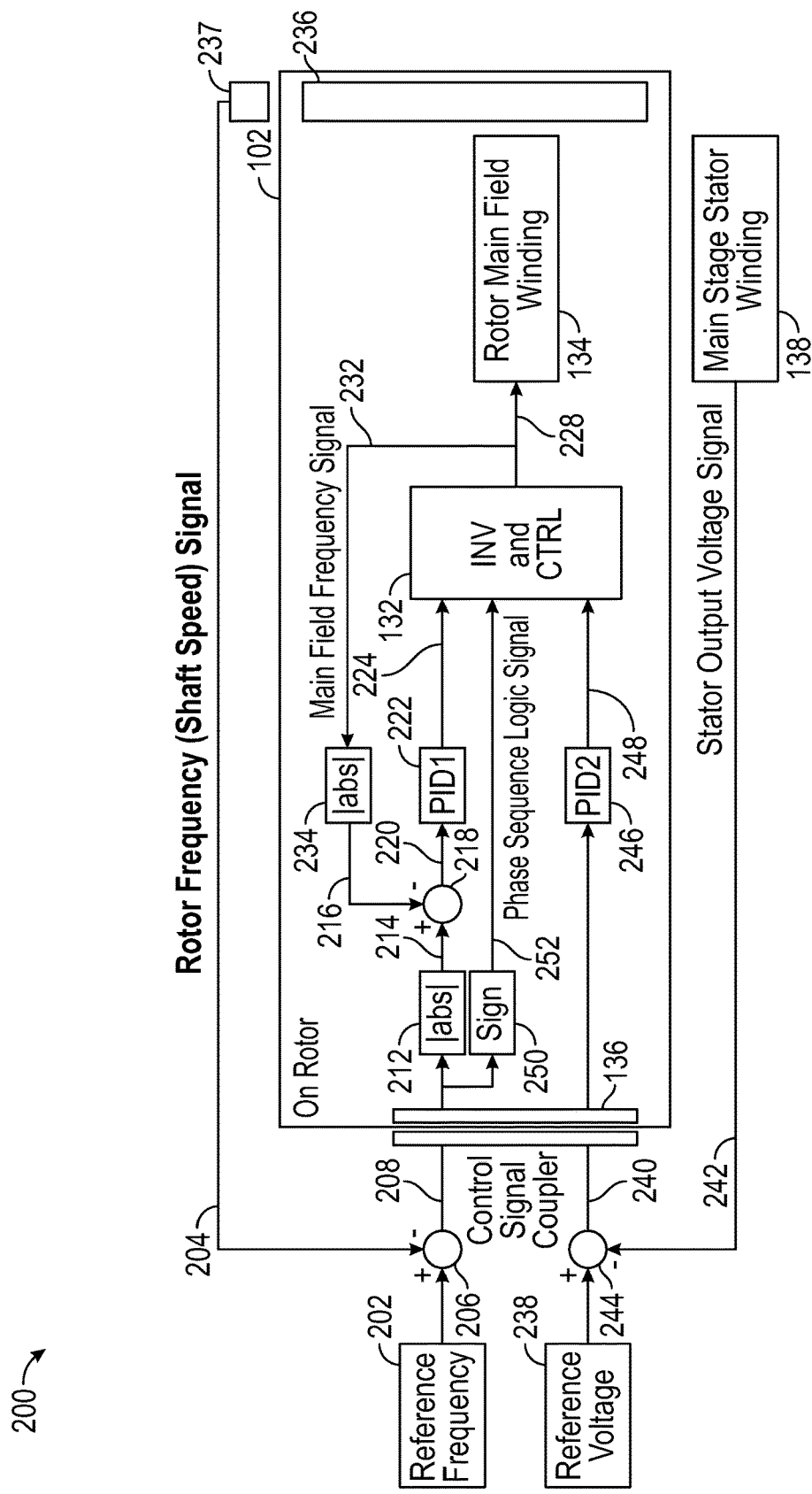
FIG. 2 is a block diagram depicting an embodiment of a signal control system for an independent speed variable frequency AC generator.

Referring to FIG. 2, a control signal system 200 for an independent speed variable frequency AC generator is depicted. The control signal system 200 is functionally depicted as including summing points 206, 218, 244, absolute value functions 212, 234, and a sign function 250.

Although depicted functionally, each of these elements may be implemented using structural components. For example, a first summing point 206 may be implemented as either logic hardware (digital logic gates or analog comparator circuitry) or software running within the generator control unit 124 (shown in FIG. 1). A second summing point 218 may be implemented using logic hardware and/or a processor attached to the rotor 102. Likewise, a third summing point 244 may be implemented as logic hardware and/or software running within the generator control unit 124. The absolute value functions 212, 234 and the sign function 250 may also be implemented as logic hardware and/or software running on a processor attached to the rotor 102.

Although FIG. 1 depicts, the generator control unit 124 as attached to the stator 104, multiple controller components may be attached to the rotor 102. For example, the summing point 218, the absolute value functions 212, 234, and the sign function 250 may be considered as part of the generator control unit 124, but may be implemented as circuitry attached to the rotor 102.

The system 200 may receive a reference frequency signal 202. The reference frequency signal 202 may represent a desired frequency for an AC power supply. In particular, the AC power supply may be used for aerospace applications and may supply power to a propulsion motor and/or other systems and devices. The reference frequency signal 202 may be a constant input signal "hardwired" into the generator control unit 124 or it may be an adjustable input. For example, the system 200 may be configured to output variable frequencies to meet the needs of a particular load. In cases where a constant frequency is desired, it can output a fixed frequency. In other cases, e.g, when the load is motor, the system 200 can output variable frequencies to meet the speed change need. The reference frequency signal 202 may be generated through software running at a processor (e.g., a processor of the generator control unit 124) or through other logic and/or hardware. In an illustrative example, the reference frequency signal 202 may be equal to 400 Hz. This frequency is for illustrative purposes only. As explained above, the reference frequency signal 202 may be static or dynamic, and may be modified based on a particular load.

The reference frequency signal 202 may be combined with a rotor frequency signal 204 at a first summing point 206, and may produce a first intermediate signal 208 that represents a difference between the reference frequency signal 202 and the rotor frequency signal 204. Conceptually, the first intermediate signal 208 may represent a desired change in the rotational frequency of a rotating magnetic field from a measured rotational frequency of the rotor 102. With respect to the illustrative example above, if the rotor frequency signal 204 is equal to 300 Hz, then the first intermediate signal 208 would be equal to 100 Hz, which represents a desired increase in frequency from the rotational frequency (i.e., 300 Hz) of the rotor 102 in order to equal the reference frequency signal 202 (i.e., 400 Hz). The first intermediate signal 208 may be transmitted from a stator (e.g., the stator 104) to the rotor 102 via the control signal coupler 136.

On the rotor 102, the first intermediate signal 208 may be input into an absolute value function 212 to generate a magnitude signal 214 of the first intermediate signal 208. At a second summing point 218, the magnitude signal 214 of the first intermediate signal 208 may be combined with a magnitude signal 216 of a main field frequency signal 232 to produce a second intermediate signal 220. The second intermediate signal 220 may represent a difference between the magnitudes of first intermediate signal 208 and the main field frequency signal 232. In other words, the second intermediate signal 220 may represent a desired change in the rotational frequency of a main rotating magnetic field relative to a current rotational frequency of the main rotating magnetic field at the rotor main field winding 134. In continuing the example above, if the main field frequency signal 232 is equal to 90 Hz, then the second intermediate signal 220 would equal 10 Hz, which represents a desired increase in the rotational frequency of a rotating magnetic field relative to the rotor 102.

In other words, in the illustrative example, the main rotating magnetic field may be rotating at a frequency of 90 Hz relative to the rotor 102, and the rotor 102 may be rotating at a frequency of 300 Hz relative to the stator 104. Therefore, the main rotating magnetic field may be rotating at a frequency of 390 Hz relative to the stator 104. In order to produce a power signal with a frequency of 400 Hz, the rotational frequency of the main rotating magnetic field would need to increase by 10 Hz. As such, in this example, the second intermediate signal 220 would be equal to 10 Hz.

The second intermediate signal 220 may be provided to a first proportional-integral-derivative (PID) controller 222. The first PID controller 222 may convert the second intermediate signal 220 into an inverter control signal 224 that directs an inverter 132 to adjust a three-phase current 228 provided to a rotor main field winding 134. The three-phase current 228, when passed through the rotor main field winding 134 may create a rotating magnetic field, where a frequency, magnitude, and phase of the rotating magnetic field depends on a frequency, magnitude, and phase of the three-phase current 228. By adjusting the three-phase current 228, the inverter 132 may control a rotation of the rotating magnetic field relative to the rotor 102, thereby separating the rotational frequency of the rotating magnetic field from a rotational frequency of the rotor 102. The first PID controller 222 may be part of the generator control unit 124 and may be coupled to the rotor 102.

From the three-phase current 228, the main field frequency signal 232 may be measured and derived for use as a feedback signal at the second summing point 218. The main field frequency signal 232 may be passed through an absolute value function 234 to produce the magnitude signal 216 of the main field frequency signal 232 used at the second summing point 218. Likewise, a rotor speed encoder may measure and derive a rotor frequency signal 204 based on a rotational frequency of the rotor 102. The motor speed encoder may include a first portion 236 attached to the rotor, and a second portion 237 attached to the stator. In some embodiments, the first portion may be magnetic or optical source and the second portion 237 may be a detector configured to calculate the rotational frequency of the rotor 102 based on signals received from the magnetic or optical source. The rotor frequency signal 204 may be provided as a feedback signal used at the first summing point 206.

The first intermediate signal 208 may also be passed to the sign function 250. The sign function 250 may convert the first intermediate signal 208 into a direction signal 252. The direction signal 252 may indicate a desired rotational direction of a rotating magnetic field relative to the rotor 102. A negative direction signal may indicate that the desired rotational frequency is less than the rotational frequency of the rotor 102. A positive direction signal may indicate that the desired rotational frequency is greater than a rotational frequency of the rotor 102. The direction signal 252 may be used by the inverter 132 to control the three-phase current 228 to implement a desired direction of rotation of the rotating magnetic field relative to the rotor 102.

The system 200 may further receive a reference voltage signal 238. The reference voltage signal 238 may represent a desired voltage for an AC power supply. In particular, the AC power supply may be used for aerospace applications and may supply power to a propulsion motor and/or other systems and devices. The reference voltage signal 238 may be a constant input signal "hardwired" into the generator control unit 124 or it may be an adjustable input. It may be generated through software running at a processor (e.g., a processor of the generator control unit 124) or through other logic and/or hardware. In an illustrative example, the reference voltage signal 238 may be equal to 105 VAC or 230 VAC.

The reference voltage signal 238 may be combined with a stator output voltage signal 242 at a third summing point 244, and may produce a third intermediate signal 240 that represents a difference between the reference voltage signal 238 and the stator output voltage signal 242. Conceptually, the third intermediate signal 240 may represent a desired change in the voltage produced at a main stage stator winding 138 by the rotating magnetic field at the rotor main field winding 134. The third intermediate signal 240 may be transmitted from the stator (e.g., the stator 104) to the rotor 102 via the control signal coupler 136.

The third intermediate signal 240 may be provided to a second PID controller 246. The second PID controller 246 may convert the third intermediate signal 240 into an inverter control signal 248 that directs an inverter 132 to adjust the three-phase current 228 provided to a rotor main field winding 134. In particular, a magnitude of the three-phase current 228 may be adjusted to increase or decrease the magnitude of the rotating magnetic field, thereby resulting in a higher or lower voltage produced at the main stage stator winding 138. As with the first PID controller 222, the second PID controller 246 may be part of the generator control unit 124 and may be coupled to the rotor 102.

A benefit of the system 200 is that each of the phase, magnitude, and frequency of a rotating magnetic field may be controlled at the rotor main field winding 134 in order to produce an AC electrical power source at the main stage stator winding 138 that has a frequency, phase, and voltage that is independent of the frequency of the rotor 102. Other advantages may exist.

Figure 3:
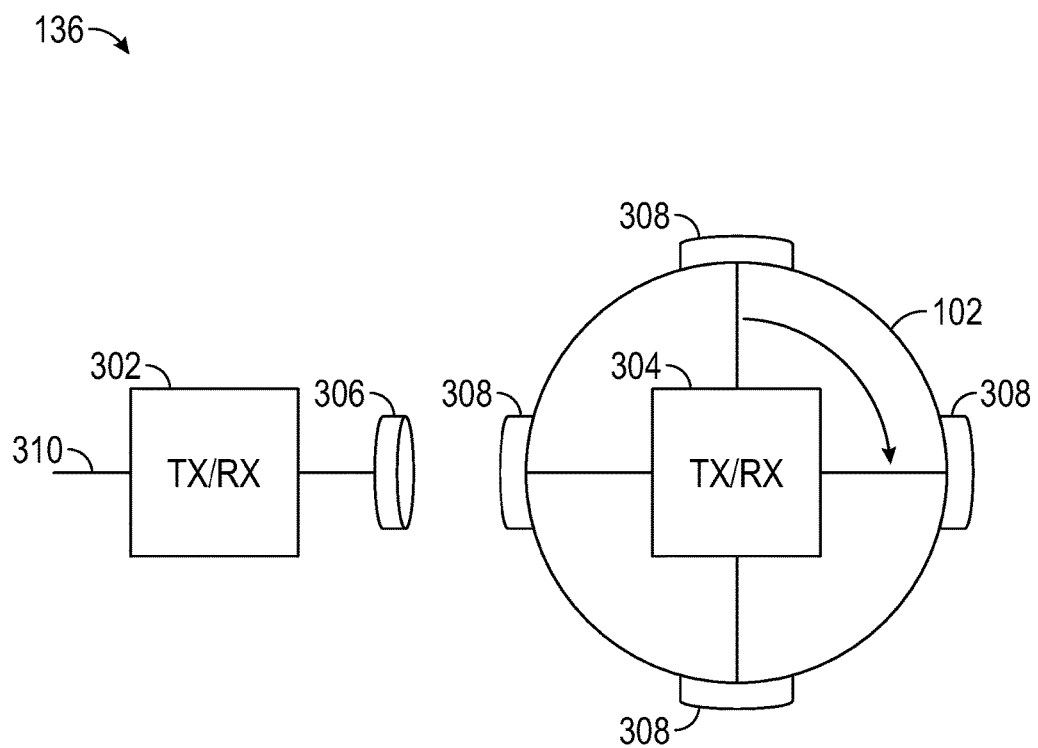
FIG. 3 is a diagram depicting an embodiment of a control signal coupler for an independent variable frequency AC generator apparatus.

Referring to FIG. 3, an embodiment of a control signal coupler 136 for an independent variable frequency AC generator apparatus is depicted. The control signal coupler 136 may include a first transceiver 302 and a second transceiver 304. In some embodiments, the control signal coupler 136 may be configured for one-way communication. In that case, the first transceiver 302 may actually be a transmitter while the second transceiver 304 may actually be a receiver, and vice versa.

The control signal coupler 136 may further include a first communication disc 306, which may be attached to a stator (e.g., the stator 104), and one or more second communication discs 308, which may be attached to a rotor 102. In some embodiments, the first communication disc 306 may include a light source (e.g., an emitter) and the second communication disc 308 may include a light detector (e.g., a phototransistor).

During operation, a control signal 310 may be sent to the first transceiver 302. While the rotor 102 is rotating, the first transceiver 302 may transmit data from the first communication disc 306 to the one or more second communication discs 308. The transmissions may be timed such that they occur while the one or more second communication discs 308 are facing the first communication disc 306. Transmission may be paused while the one or more second communication discs 308 are facing away. While FIG. 3 depicts four second communication discs 308, more or fewer than four are possible. Having more second communication discs 308 may decrease interruptions in communication.

A benefit of the control signal coupler 136 is that it may produce less friction as compared to contact signal couplers. This may result on less power loss at the apparatus 100. As explained herein, by eliminating contact between the stator 104 and the rotor 102, performance issues, such as arcing, wearing, and contact resistance may be avoided. This may result in greater reliability, lower maintenance costs, less downtime, and reduced power loss. Other advantages may exist.

Figure 4:
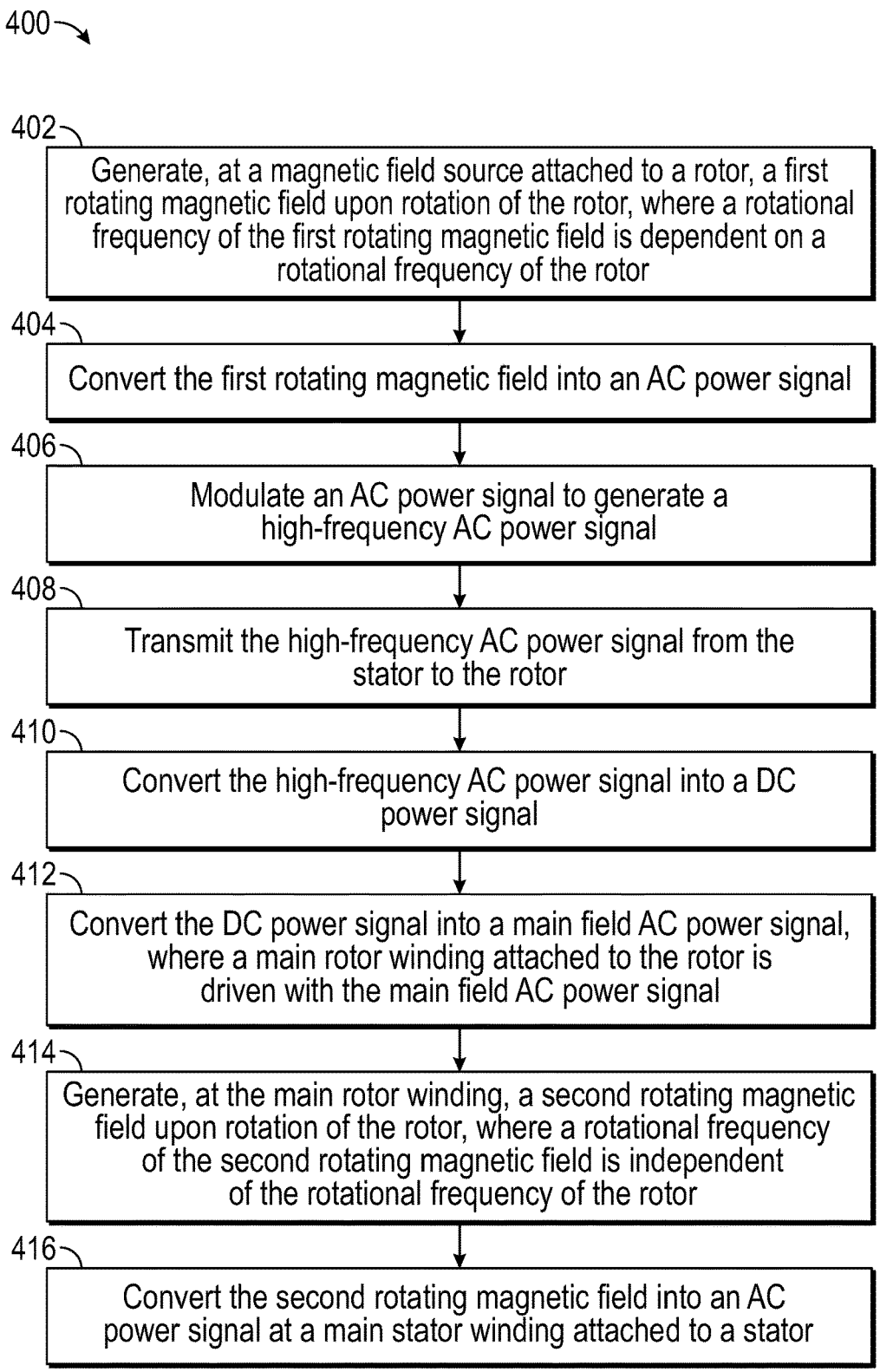
FIG. 4 is a flow diagram depicting an embodiment of a method for independent speed variable frequency AC generation.

Referring to FIG. 4, an embodiment of a method 400 for independent speed variable frequency AC generation is depicted. The method 400 may include generating, at a magnetic field source attached to a rotor, a first rotating magnetic field upon rotation of the rotor, where a rotational frequency of the first rotating magnetic field is dependent on a rotational frequency of the rotor, at 402. For example, a first rotating magnetic field may be generated at the magnetic field source 120 as the rotor 102 rotates.

The method 400 may further include converting the first rotating magnetic field into an AC power signal, at 404. For example, the pilot winding 122 may be configured to convert the first rotating magnetic field into an AC power signal that is passed to the generator control unit 124.

The method 400 may also include modulating an AC power signal to generate a high-frequency AC power signal, at 406. For example, the generator control unit 124 may modulate the AC power signal to generate an HF three-phase AC power signal that is passed to the first HF transformer winding 126.

The method 400 may include transmitting the high-frequency AC power signal from the stator to the rotor, at 408. For example, the first HF transformer winding 126 may transmit the HF AC power signal to the second HF transformer winding 128.

The method 400 may further include converting the high-frequency AC power signal into a DC power signal, at 410. For example, the rectifier 130 may convert the HF AC power signal into a DC power signal that is transmitted to the inverter 132.

The method 400 may also include converting the DC power signal into a main field AC power signal, where a main rotor winding attached to the rotor is driven with the main field AC power signal, at 412. For example, the inverter 132 may convert the DC power signal into a main field AC power signal to drive a main rotor winding 134.

The method 400 may include generating, at the main rotor winding, a second rotating magnetic field upon rotation of the rotor, where a rotational frequency of the second rotating magnetic field is independent of the rotational frequency of the rotor, at 414. For example, based on the main field AC power signal, the main rotor winding 134 may generate a second rotating magnetic field that rotates independently from the rotor 102.

The method 400 may also include converting the second rotating magnetic field into an AC power signal at a main stator winding attached to a stator, at 416. For example, the main stator winding 138 may convert the second rotating magnetic field into an AC power signal for distribution to various AC systems.

A benefit of the method 400 is that by generating a second rotating magnetic field that rotates independently from the rotor 102, a frequency, phase, and magnitude of a power signal for an AC system may be independent from a rotational frequency of the rotor 102. Further, fewer power conversion stages may be required as compared to typical constant speed power generation systems that include additional stages to generate power. By requiring fewer stages, the method 400 may be performed with a higher efficiency and lower weight requirements. Other advantages may exist.

Figure 5:
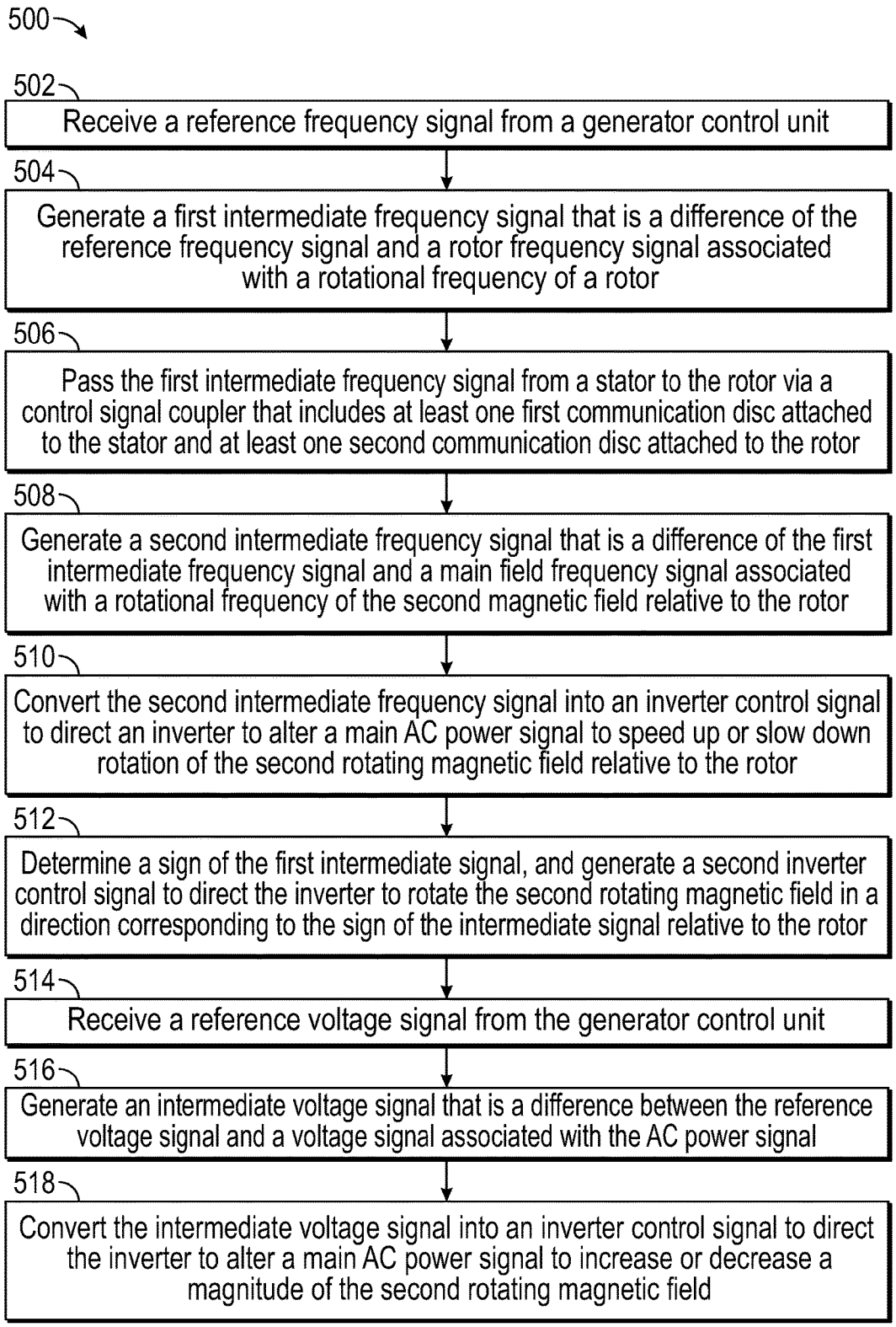
FIG. 5 is a flow diagram depicting an embodiment of a method of controlling a rotating magnetic field for independent speed variable frequency AC generation.

Referring to FIG. 5, a method 500 of controlling a rotating magnetic field for independent speed variable frequency AC generation is depicted. The method 500 may be used in conjunction with, or as part of, the method 400 of FIG. 4.

The method 500 may include receiving a reference frequency signal from a generator control unit, at 502. For example, the reference frequency signal 202 may be received at the generator control unit 124.

The method 500 may further include generating a first intermediate frequency signal that is a difference of the reference frequency signal and a rotor frequency signal associated with a rotational frequency of a rotor, at 504. For example, the first intermediate signal 208 may be generated.

The method 500 may also include passing the first intermediate frequency signal from a stator to the rotor via a control signal coupler that includes at least one first communication disc attached to the stator and at least one second communication disc attached to the rotor, at 506. For example, the first intermediate signal 208 may be passed to the rotor 102 via the control signal coupler 136, which may include the first communication disc 306 and at least one second communication disc 308.

The method 500 may also include generating a second intermediate frequency signal that is a difference of the first intermediate frequency signal and a main field frequency signal associated with a rotational frequency of the second magnetic field relative to the rotor, at 508. For example, the second intermediate signal 220 may be generated.

The method 500 may include converting the second intermediate frequency signal into an inverter control signal to direct an inverter to alter a main field AC power signal to speed up or slow down rotation of the second rotating magnetic field relative to the rotor, at 510. For example, the second intermediate signal 220 may be converted into the inverter control signal 224 at the first PID controller 222.

The method 500 may further include determining a sign of the first intermediate signal, and generating a second inverter control signal to direct the inverter to rotate the second rotating magnetic field in a direction corresponding to the sign of the intermediate signal relative to the rotor, at 512. For example, the sign of the first intermediate signal 208 may be determined at the sign function 250 and passed to the inverter 132.

The method 500 may also include receiving a reference voltage signal from the generator control unit, at 514. For example, the reference voltage signal 238 may be received from the generator control unit 124.

The method 500 may include generating an intermediate voltage signal that is a difference between the reference voltage signal and a voltage signal associated with the AC power signal, at 516. For example, the intermediate voltage signal 240 may be generated.

The method 500 may further include converting the intermediate voltage signal into an inverter control signal to direct the inverter to alter a main field AC power signal to increase or decrease a magnitude of the second rotating magnetic field, at 518. For example, the intermediate voltage signal 240 may be converted into the inverter control signal 248.

Although various embodiments have been shown and described, the present disclosure is not so limited and will be understood to include all such modifications and variations as would be apparent to one skilled in the art.

What is claimed is:

1. An independent speed variable frequency alternating current (AC) generator apparatus comprising:
    a rotor and a stator, the rotor configured to rotate relative to the stator;
    a magnetic field source attached to the rotor and configured to generate a first rotating magnetic field upon rotation of the rotor, wherein a rotational frequency of the first rotating magnetic field is dependent on a rotational frequency of the rotor;
    a main rotor winding attached to the rotor and configured to generate a second rotating magnetic field upon the rotation of the rotor, wherein a rotational frequency of the second rotating magnetic field is independent of the rotational frequency of the rotor;
    an inverter attached to the rotor and configured to convert a direct current power signal into a main field AC power signal, wherein the main rotor field winding is driven with the main field AC power signal; and
    a generator control unit coupled to the inverter and configured to control the main field AC power signal, thereby controlling a rotational speed, a direction, an amplitude, or any combination thereof of the second rotating magnetic field relative to the rotor, wherein the generator control unit includes control circuitry attached to the stator and control circuitry attached to the rotor, wherein the control circuitry attached to the rotor includes at least one proportional-integral-derivative (PID) controller integrated into the rotor.

2. The apparatus of claim 1, wherein the magnetic field source includes a permanent magnet.

3. The apparatus of claim 1, further comprising:
    a pilot winding attached to the stator and configured to convert the first rotating magnetic field into an AC power signal.

4. The apparatus of claim 3, wherein the generator control unit is configured to modulate the AC power signal to generate a high-frequency AC power signal for transmission to the rotor, wherein a frequency of the high-frequency AC power signal is greater than the rotational frequency of the rotor.

5. The apparatus of claim 1, further comprising a high frequency transformer configured to transmit a high-frequency AC power signal from the stator to the rotor.

6. The apparatus of claim 5, wherein the high frequency transformer includes a first power transformer winding attached to the stator and a second power transformer winding attached to the rotor, wherein the first power transformer winding is configured to transfer the high-frequency AC power signal to the second power transformer winding.

7. The apparatus of claim 5, wherein the high frequency transformer omits contact power transmission mechanisms between the stator and the rotor.

8. The apparatus of claim 1, further comprising:
    a rectifier attached to the rotor and configured to convert a high-frequency AC power signal into the direct current power signal.

9. The apparatus of claim 1, wherein the at least one PID controller is coupled to the inverter to control a frequency of the second rotating magnetic field, and wherein the control circuitry attached to the rotor includes an additional PID controller coupled to the inverter to control a magnitude of the second rotating magnetic field.

10. The apparatus of claim 1, wherein the control circuitry attached to the stator is communicatively coupled to the control circuitry attached to the rotor via a control signal coupler that includes at least one first communication disc attached to the stator and at least one second communication disc attached to the rotor.

11. The apparatus of claim 10, wherein the first communication disc includes a light signal source and wherein the second communication disc includes a phototransistor.

12. The apparatus of claim 1, further comprising:
    a main stator winding configured to convert the second rotating magnetic field into an AC power signal.

13. A method for independent speed variable frequency alternating current (AC) generation comprising:
    generating, at a magnetic field source attached to a rotor, a first rotating magnetic field upon rotation of the rotor, wherein a rotational frequency of the first rotating magnetic field is dependent on a rotational frequency of the rotor; and
    generating, at a main rotor winding attached to the rotor, a second rotating magnetic field upon the rotation of the rotor, wherein a rotational frequency of the second rotating magnetic field is independent of the rotational frequency of the rotor; and
    converting the second rotating magnetic field into an AC power signal at a main stator winding attached to a stator;
    receiving a reference frequency signal from a generator control unit;
    generating a first intermediate frequency signal that is a difference of the reference frequency signal and a rotor frequency signal associated with the rotational frequency of the rotor;
    generating a second intermediate frequency signal that is a difference of the first intermediate frequency signal and a main field frequency signal associated with the rotational frequency of the second rotating magnetic field relative to the rotor; and
    converting the second intermediate frequency signal into an inverter control signal to direct an inverter to alter the main field AC power signal to speed up or slow down rotation of the second rotating magnetic field relative to the rotor.

14. The method of claim 13, further comprising:
    converting the first rotating magnetic field into the AC power signal;
    modulating the AC power signal to generate a high-frequency AC power signal;
    transmitting the high-frequency AC power signal from the stator to the rotor;
    converting the high-frequency AC power signal into a direct current (DC) power signal; and
    converting the DC power signal into a main field AC power signal, wherein the main rotor winding is driven with the main field AC power signal.

15. The method of claim 13, wherein the first intermediate frequency signal is passed from the stator to the rotor via a control signal coupler that includes at least one first communication disc attached to the stator and at least one second communication disc attached to the rotor.

16. The method of claim 13, wherein generating the second rotating magnetic field further comprises:
    determining a sign of the first intermediate frequency signal; and generating a second inverter control signal to direct the inverter to rotate the second rotating magnetic field in a direction corresponding to the sign of the intermediate signal relative to the rotor.

17. The method of claim 13, further comprising:

receiving a reference voltage signal from the generator control unit;

generating an intermediate voltage signal that is a difference between the reference voltage signal and a voltage signal associated with the AC power signal; and converting the intermediate voltage signal into an inverter control signal to direct the inverter to alter a main field AC power signal to increase or decrease a magnitude of the second rotating magnetic field.

18. An alternating current (AC) generator rotor device comprising:

a magnetic field source configured to generate a first rotating magnetic field upon rotation of a rotor, wherein a rotational frequency of the first rotating magnetic field is dependent on a rotational frequency of the rotor; and a main rotor winding configured to generate a second rotating magnetic field upon the rotation of the rotor, wherein a rotational frequency of the second rotating magnetic field is independent of the rotational frequency of the rotor; and a generator control unit that includes control circuitry attached to a stator and control circuitry attached to the rotor, wherein the control circuitry attached to the rotor includes at least one proportional-integral-derivative (PID) integrated into the rotor.

19. The device of claim 18, further comprising:

a power transformer winding configured to receive a high-frequency AC power signal;

a rectifier configured to convert the high-frequency AC power signal into a direct current (DC) power signal; and an inverter configured to convert the DC power signal into a main field AC power signal, wherein the main rotor winding is driven with the main field AC power signal.

20. The device of claim 19, wherein the generator control unit is coupled to the inverter and configured to control the main field AC power signal, thereby controlling a rotational speed, a direction, an amplitude, or any combination thereof of the second rotating magnetic field relative to the rotor.

* * * * *